(12) United States Patent
Tao et al.

(10) Patent No.: US 10,929,411 B2
(45) Date of Patent: Feb. 23, 2021

(54) PRECEDENCE-BASED FAST AND SPACE-EFFICIENT RANKING

(71) Applicant: Microsoft Technology Licensing, LLC, Redmond, WA (US)

(72) Inventors: Jianbao Tao, San Jose, CA (US); Santosh Kumar Kancha, Pleasanton, CA (US); Keren Kochava Baruch, San Francisco, CA (US); Anthony Duane Duerr, Castro Valley, CA (US); Kunal Mukesh Cholera, Mountain View, CA (US); Kumaresh Pattabiraman, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 246 days.

(21) Appl. No.: 16/177,075

(22) Filed: Oct. 31, 2018

(65) Prior Publication Data

US 2020/0134036 A1    Apr. 30, 2020

(51) Int. Cl.
  *G06F 16/2457*   (2019.01)
  *G06F 16/248*    (2019.01)
  *G06F 16/9535*   (2019.01)

(52) U.S. Cl.
  CPC ...... *G06F 16/24578* (2019.01); *G06F 16/248* (2019.01); *G06F 16/9535* (2019.01)

(58) Field of Classification Search
  USPC ......................................................... 707/706
  See application file for complete search history.

(56) References Cited

U.S. PATENT DOCUMENTS

| | | | | |
|---|---|---|---|---|
| 8,370,337 | B2* | 2/2013 | Kanungo | G06F 16/24578 707/723 |
| 9,171,078 | B2* | 10/2015 | Imig | G06F 16/951 |
| 10,430,725 | B2* | 10/2019 | Anderson | G06N 20/00 |
| 2009/0171722 | A1* | 7/2009 | Roberts | G06Q 30/02 705/7.39 |
| 2010/0082609 | A1* | 4/2010 | Sun | G06Q 30/02 707/723 |
| 2010/0281012 | A1* | 11/2010 | Imig | G06F 16/951 707/708 |
| 2011/0258149 | A1* | 10/2011 | Kanungo | G06F 16/9558 706/12 |
| 2015/0074093 | A1* | 3/2015 | Murthy | G06F 16/24578 707/723 |
| 2016/0019213 | A1* | 1/2016 | Carmel | G06F 16/951 707/728 |
| 2016/0055252 | A1* | 2/2016 | Makeev | G06F 16/24578 707/733 |
| 2017/0132323 | A1* | 5/2017 | Kuralenok | G06F 16/248 |
| 2017/0185602 | A1* | 6/2017 | Gusev | G06F 16/951 |

* cited by examiner

*Primary Examiner* — Cam Linh T Nguyen
(74) *Attorney, Agent, or Firm* — Schwegman Lundberg & Woessner, P.A.

(57) ABSTRACT

In an example embodiment, a fast and space-efficient ranking mechanism is used for vertical searches. A precedence is assigned to a plurality of features based on the relative importance of those features to the provider of a vertical search engine. In an example embodiment, this relative importance may be explicitly indicated by the provider of the vertical search engine. A unique data structure may then be created that incorporates the precedence of each feature.

20 Claims, 11 Drawing Sheets

PRECEDENCE-BASED FAST AND SPACE-EFFICIENT RANKING

TECHNICAL FIELD

The present disclosure generally relates to technical problems encountered in ranking online search results. More specifically, the present disclosure relates to the use of a precedence-based fast and space-efficient ranking mechanism.

BACKGROUND

The rise of the Internet has occasioned two disparate yet related phenomena: the increase in the presence online connected networking services, with their corresponding member profiles visible to large numbers of people, and the increase in the use of these online connected networking services to perform searches or obtain information. An example of a common search or recommendation provided on an online connected networking service is the search for jobs that have been posted on, or linked to by, the connected networks.

When a search has been completed, a series of search results have been obtained. It is common for these search results to then be ranked using a ranking algorithm and a subset of the top ranked search results presented to the searcher. Ranking algorithms are typically designed with horizontal searches in mind. A horizontal search is a search for results that may be of many different types, either in structure/format (e.g., different file types) or in content (e.g., many different topics/subject matters). A general search engine such as Bing™ from Microsoft, Inc. of Redmond, Wash. is an example of a horizontal search engine.

Owing to the fact that horizontal searches return a large variety of different types of search results, their ranking algorithms are often complex, utilizing formulas incorporating hundreds or even thousands of features extracted from the query, search result, and even searcher information. The formulas themselves are often encapsulated in machine learned models. The result is that a ranking score calculated by such a ranking algorithm can take up significant processing power, time, and space during the calculation stage. While such drawbacks might be necessary in order to maximize the relevancy of search results in horizontal searches, the complexity of the formulas is not necessary in ranking vertical search results, where the narrowness of the topics returned limits the number of features to a more manageable amount. This is added to the fact that oftentimes creators of vertical search engines are smaller companies than those creating horizontal search engines, and thus may not have the same server capacity (in processing power and space) as the creators of horizontal search engines. Thus, it would be beneficial to have a faster and more space efficient mechanism for ranking search results from vertical searches.

BRIEF DESCRIPTION OF THE DRAWINGS

Some embodiments of the technology are illustrated, by way of example and not limitation, in the figures of the accompanying drawings.

DETAILED DESCRIPTION

Overview

Figure 1:
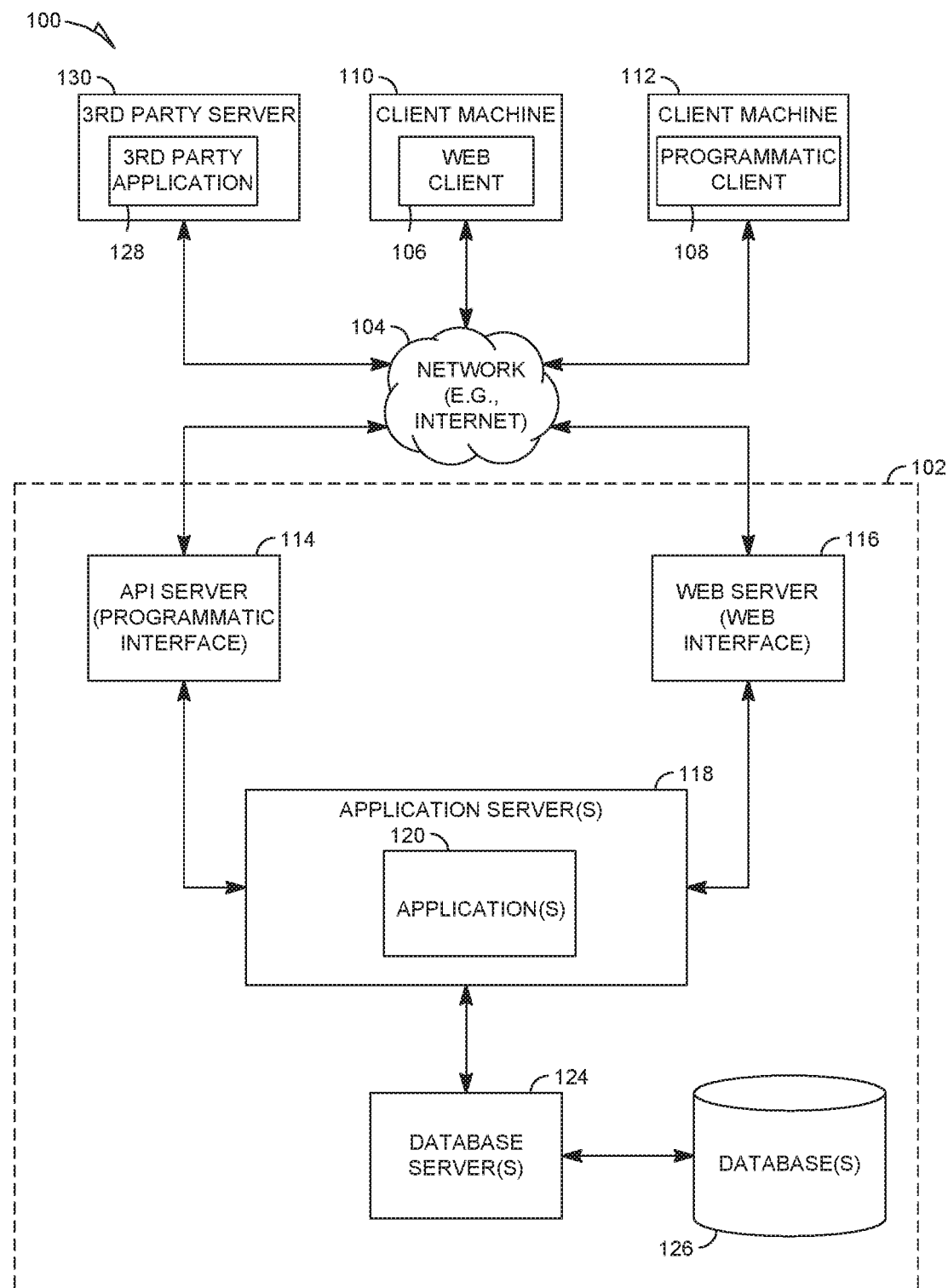
FIG. 1 is a block diagram illustrating a client-server system, in accordance with an example embodiment.

The present disclosure describes, among other things, methods, systems, and computer program products that individually provide various functionality. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

In an example embodiment, a fast and space-efficient ranking mechanism is used for vertical searches. A precedence is assigned to a plurality of features based on the relative importance of those features to the provider of a vertical search engine. In an example embodiment, this relative importance may be explicitly indicated by the provider of the vertical search engine. A unique data structure may then be created that incorporates the precedence of each feature. This unique data structure may be called a vertical search score data structure. In an example embodiment, this vertical search score data structure may be a linear data structure such as a floating point number. The vertical search score data structure may comprise a number of portions, with each portion containing a number. What exactly represents a portion of a data structure may vary based on the format of the data structure. For example, portions of a floating point number are referred to as digits. Portions of a linked list, however, are referred to as cells.

Whatever the nomenclature utilized, the portions of the vertical search score data structure are ordered based on the precedence. When a search result is evaluated against a query, the portions of the vertical score data structure are filled in with numbers based on the evaluations of the underlying features. Rather than submitting these numbers to a formula for calculation of a vertical search score, the vertical search score data structure itself represents the vertical search score, when its portions are read in order.

For example, assume a vertical search engine provider for a vertical search engine searching job postings specifies that the following features are important and are provided in declining order of importance: job location, number of matched terms, job title, age of listing, and similarity of company. Job location may then be represented by a first digit in the vertical search score data structure (either 1 or 0 depending upon whether the location of the job listing matches a location specified in the query). A number of matched terms may be represented by a second digit and third digit in the vertical search score data structure (0-99 matching terms between the query and the job listing). A job title may be represented by a fourth digit in the vertical search score data structure (0-9 depending on the degree that the query job title is similar to the job title in the job listing). An age of listing may be represented by a fifth digit in the vertical search score data structure (0-9 based on how old the listing is, with newer listings assigned a higher number). A similarity of company may be represented by a sixth digit in the vertical search score data structure (0-9 depending on the degree that the query company is similar to the company in the job listing).

Thus, a job listing that matches the location specified in the query, has 3 matching terms in the query, has an exact match on job title and company, and is very new (a few hours old) may be have a vertical search score data structure with the following digits: 103999. Note that this only takes up six digits of storage. Additionally, arriving at this score did not require any expensive calculations or usage of a complicated and/or machine learned model.

The rest of the present disclosure will describe the above techniques in the context of a specific example, namely the ranking of job postings in an online service. Nothing in this disclosure shall be interpreted, however, as limiting the scope of coverage to this specific example, as the techniques described herein can be expanded to any vertical search result ranking process.

FIG. 1 is a block diagram illustrating a client-server system 100, in accordance with an example embodiment. A networked system 102 provides server-side functionality via a network 104 (e.g., the Internet or a wide area network (WAN)) to one or more clients. FIG. 1 illustrates, for example, a web client 106 (e.g., a browser) and a programmatic client 108 executing on respective client machines 110 and 112.

An application program interface (API) server 114 and a web server 116 are coupled to, and provide programmatic and web interfaces respectively to, one or more application servers 118. The application server(s) 118 host one or more applications 120. The application server(s) 118 are, in turn, shown to be coupled to one or more database servers 124 that facilitate access to one or more databases 126. While the application(s) 120 are shown in FIG. 1 to form part of the networked system 102, it will be appreciated that, in alternative embodiments, the application(s) 120 may form part of a service that is separate and distinct from the networked system 102.

Further, while the client-server system 100 shown in FIG. 1 employs a client-server architecture, the present disclosure is, of course, not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the application(s) 120 via the programmatic interface provided by the API server 114.

FIG. 1 also illustrates a third-party application 128, executing on a third-party server 130, as having programmatic access to the networked system 102 via the programmatic interface provided by the API server 114. For example, the third-party application 128 may, utilizing information retrieved from the networked system 102, support one or more features or functions on a website hosted by a third party. The third-party website may, for example, provide one or more functions that are supported by the relevant applications 120 of the networked system 102.

In some embodiments, any website referred to herein may comprise online content that may be rendered on a variety of devices including, but not limited to, a desktop personal computer (PC), a laptop, and a mobile device (e.g., a tablet computer, smartphone, etc.). In this respect, any of these devices may be employed by a user to use the features of the present disclosure. In some embodiments, a user can use a mobile app on a mobile device (any of the machines 110, 112 and the third-party server 130 may be a mobile device) to access and browse online content, such as any of the online content disclosed herein. A mobile server (e.g., API server 114) may communicate with the mobile app and the application server(s) 118 in order to make the features of the present disclosure available on the mobile device.

Figure 2:
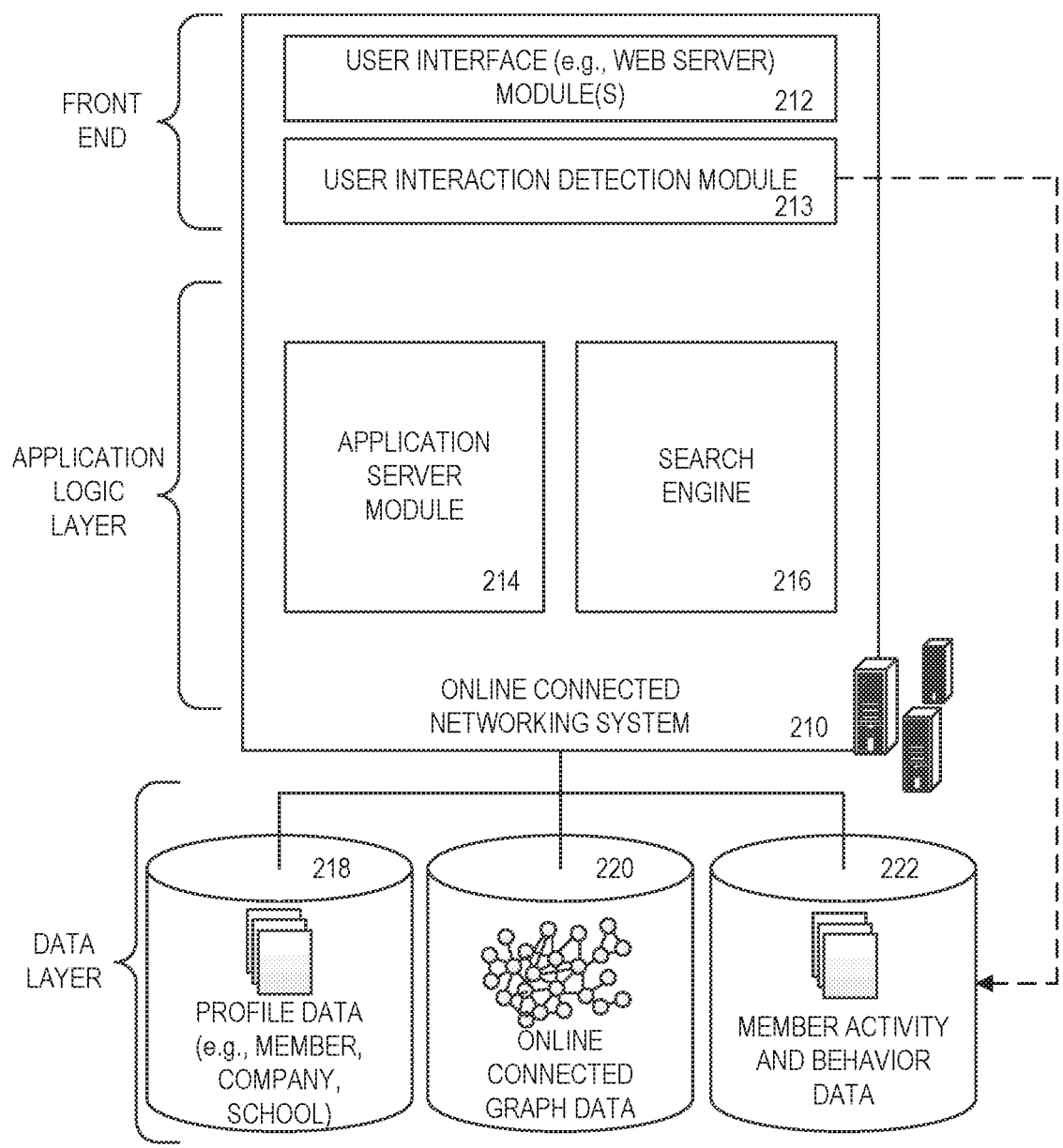
FIG. 2 is a block diagram showing the functional components of an online connected networking service, including a data processing module referred to herein as a search engine, for use in generating and providing search results for a search query, consistent with some embodiments of the present disclosure.

In some embodiments, the networked system 102 may comprise functional components of an online connected networking service. FIG. 2 is a block diagram showing the functional components of an online connected networking service, including a data processing module referred to herein as a search engine 216, for use in generating and providing search results for a search query, consistent with some embodiments of the present disclosure. In some embodiments, the search engine 216 may reside on the application server(s) 118 in FIG. 1. However, it is contemplated that other configurations are also within the scope of the present disclosure.

As shown in FIG. 2, a front end may comprise a user interface module (e.g., a web server 116) 212, which receives requests from various client computing devices and communicates appropriate responses to the requesting client devices. For example, the user interface module(s) 212 may receive requests in the form of Hypertext Transfer Protocol (HTTP) requests or other web-based API requests. In addition, a user interaction detection module 213 may be provided to detect various interactions that members have with different applications 120, services, and content presented. As shown in FIG. 2, upon detecting a particular interaction, the user interaction detection module 213 logs the interaction, including the type of interaction and any metadata relating to the interaction, in a member activity and behavior database 222.

An application logic layer may include one or more various application server modules 214, which, in conjunction with the user interface module(s) 212, generate various user interfaces (e.g., web pages) with data retrieved from various data sources in a data layer. In some embodiments, individual application server modules 214 are used to implement the functionality associated with various applications 120 and/or services provided by the online connected networking service.

As shown in FIG. 2, the data layer may include several databases 126, such as a profile database 218 for storing profile data, including both user profile data and profile data for various organizations (e.g., companies, schools, etc.). Consistent with some embodiments, when a person initially registers to become a user of the online connected networking service, the person will be prompted to provide some personal information, such as his or her name, age (e.g., birthdate), gender, interests, contact information, home town, address, spouse's and/or family members' names, educational background (e.g., schools, majors, matriculation and/or graduation dates, etc.), employment history, skills, professional organizations, and so on. This information is stored, for example, in the profile database 218. Similarly, when a representative of an organization initially registers the organization with the online connected networking service, the representative may be prompted to provide certain information about the organization. This information may be stored, for example, in the profile database 218, or another database (not shown). In some embodiments, the profile data may be processed (e.g., in the background or offline) to generate various derived profile data. For example, if a member has provided information about various job titles that the member has held with the same organization or different organizations, and for how long, this information can be used to infer or derive a member profile attribute indicating the member's overall seniority level, or seniority level within a particular organization. In some embodiments, importing or otherwise accessing data from one or more externally hosted data sources may enrich profile data for both members and organizations. For instance, with organizations in particular, financial data may be imported from one or more external data sources and made part of an organization's profile. This importation of organization data and enrichment of the data will be described in more detail later in this document.

Once registered, a user may invite other members, or be invited by other members, to connect via the online connected networking service. A "connection" may constitute a bilateral agreement by the users, such that both users acknowledge the establishment of the connection. Similarly, in some embodiments, a user may elect to "follow" another user. In contrast to establishing a connection, the concept of "following" another user typically is a unilateral operation and, at least in some embodiments, does not require acknowledgement or approval by the user that is being followed. When one user follows another, the user who is following may receive status updates (e.g., in an activity or content stream) or other messages published by the user being followed, relating to various activities undertaken by the user being followed. Similarly, when a user follows an organization, the user becomes eligible to receive messages or status updates published on behalf of the organization. For instance, messages or status updates published on behalf of an organization that a user is following will appear in the user's personalized data feed, commonly referred to as an activity stream or content stream. In any case, the various associations and relationships that the users establish with other users, or with other entities and objects, are stored and maintained within an online connected graph in an online connected graph database 220.

As users interact with the various applications 120, services, and content made available via the online connected networking service, the users' interactions and behavior (e.g., content viewed, links or buttons selected, messages responded to, etc.) may be tracked, and information concerning the users' activities and behavior may be logged or stored, for example, as indicated in FIG. 2, by the user activity and behavior database 222. This logged activity information may then be used by the search engine 216 to determine search results for a search query.

In some embodiments, the databases 218, 220, and 222 may be incorporated into the database(s) 126 in FIG. 1. However, other configurations are also within the scope of the present disclosure.

Although not shown, in some embodiments, the online connected networking system 210 provides an API module via which applications 120 and services can access various data and services provided or maintained by the online connected networking service. For example, using an API, an application may be able to request and/or receive one or more recommendations. Such applications 120 may be browser-based applications 120 or may be operating system-specific. In particular, some applications 120 may reside and execute (at least partially) on one or more mobile devices (e.g., phone or tablet computing devices) with a mobile operating system. Furthermore, while in many cases the applications 120 or services that leverage the API may be applications 120 and services that are developed and maintained by the entity operating the online connected networking service, nothing other than data privacy concerns prevents the API from being provided to the public or to certain third parties under special arrangements, thereby making the navigation recommendations available to third-party applications 128 and services.

Although the search engine 216 is referred to herein as being used in the context of an online connected networking service, it is contemplated that it may also be employed in the context of any website or online services. Additionally, although features of the present disclosure are referred to herein as being used or presented in the context of a web page, it is contemplated that any user interface view (e.g., a user interface on a mobile device or on desktop software) is within the scope of the present disclosure.

In an example embodiment, when user profiles are indexed, forward search indexes are created and stored. The search engine 216 facilitates the indexing and searching for content within the online connected networking service, such as the indexing and searching for data or information contained in the data layer, such as profile data (stored, e.g., in the profile database 218), online connected graph data (stored, e.g., in the online connected graph database 220), and member activity and behavior data (stored, e.g., in the member activity and behavior database 222), as well as job postings. The search engine 216 may collect, parse, and/or store data in an index or other similar structure to facilitate the identification and retrieval of information in response to received queries for information. This may include, but is not limited to, forward search indexes, inverted indexes, N-gram indexes, and so on.

Figure 3:
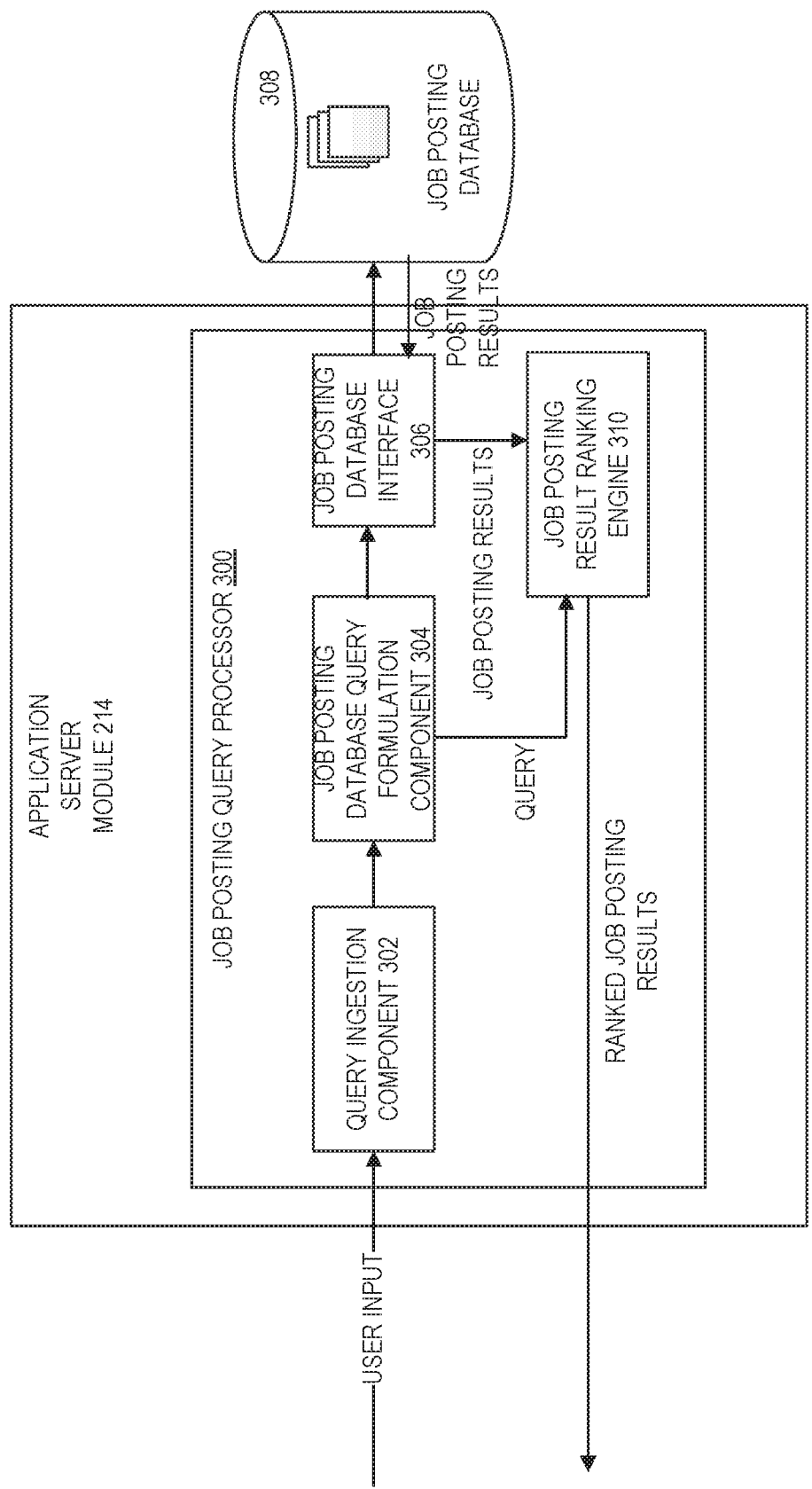
FIG. 3 is a block diagram illustrating an application server module of FIG. 2 in more detail, in accordance with an example embodiment.

FIG. 3 is a block diagram illustrating application server module 214 of FIG. 2 in more detail, in accordance with an example embodiment. While in many embodiments the application server module 214 will contain many subcomponents used to perform various different actions within the online connected networking system, in FIG. 3 only those components that are relevant to the present disclosure are depicted. A job posting query processor 300 comprises a query ingestion component 302, which receives a user input "query" related to a job posting search via a user interface (not pictured). Notably, this user input may take many forms. In some example embodiments, the user may explicitly describe a job posting search query, such as by entering one or more keywords or terms into one or more fields of a user interface screen. In other example embodiments, the job posting query may be inferred based on one or more user actions, such as selection of one or more filters, other job posting searches by the user, searches for other users or entities, and so forth.

This "query" may be sent to a job posting database query formulation component 304, which formulates an actual job posting database query, which will be sent via a job posting database interface 306 to job posting database 308. Job posting results responsive to this job posting database query may then be sent to the job posting result ranking engine 310, again via the job posting database interface 306. The job posting result ranking engine 310 then ranks the job posting results and sends the ranked job posting results back to the user interface for display to the user.

Figure 4:
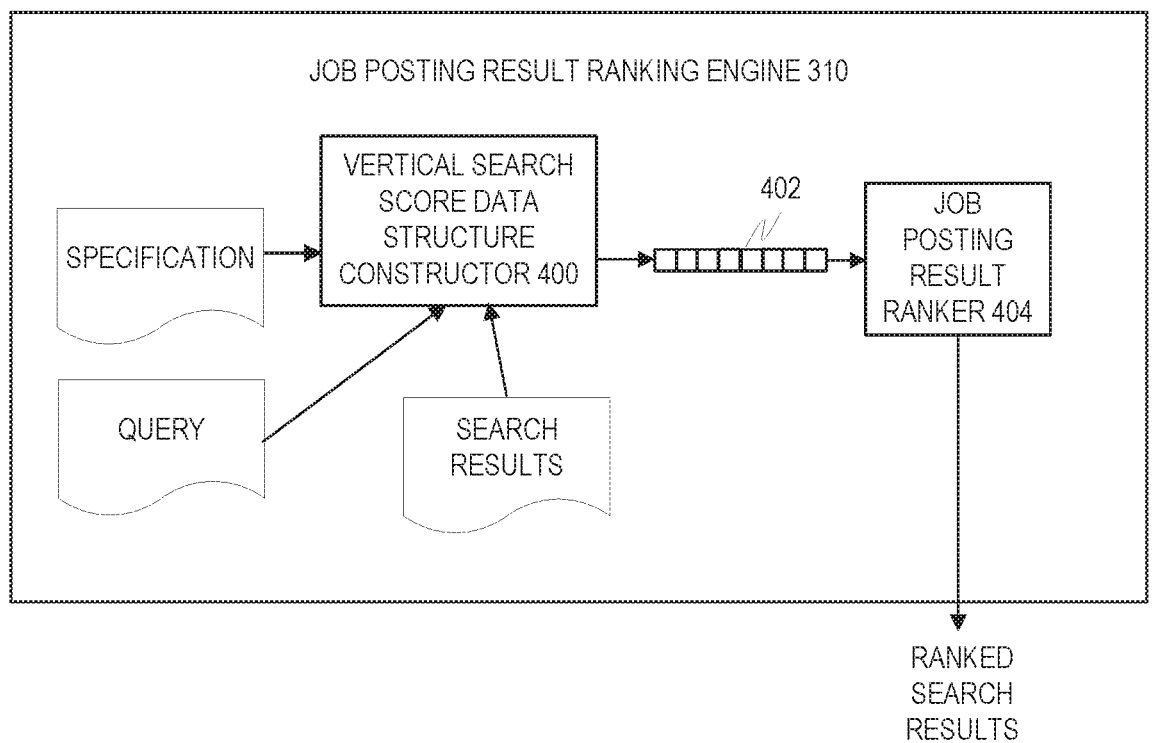
FIG. 4 is a block diagram illustrating the job posting result ranking engine of FIG. 3 in more detail, in accordance with an example embodiment.

FIG. 4 is a block diagram illustrating job posting result ranking engine 310 of FIG. 3 in more detail, in accordance with an example embodiment. The job posting result ranking engine 310 may use a vertical search score data structure constructor 400 to construct a vertical search score data structure 402 for each of the returned job posting results. The vertical search score data structure constructor 400 takes as input a specification of a series of features to be analyzed. The specification may describe not just the features to be analyzed (and how to analyze them) but also a precedence (i.e., ordering based on importance) of the features. The vertical search score data structure constructor 400 may then evaluate the query and the search result based on the specification to complete the vertical search score data structure 402 with the appropriate values. The vertical search score data structure 402 for each job posting search result is then passed to a job posting result ranker 404, which ranks the job posting search results based on the values in each vertical search score data structure 402. Notably, the vertical search score data structure constructor 400 is able to generate the corresponding vertical search score data structure 402 for each search result using a minimum of computing power, and the vertical search score data structure 402 itself takes up a minimum of space, unlike those produced by traditional model-based ranking engines. Likewise, the job posting result ranker 404 is able to easily and efficiently rank the search results by using the disparate values in the vertical search score data structure 402 as a single number representing a score, without performing any calculations or reorganization of the values. The result is the ranked job posting results found through a fast and efficient process.

The above techniques may be leveraged in order to provide a free form search engine for vertical searches that allows the user to simply type free form keywords to obtain, for example, job postings related to the keywords, ranked in an order that makes sense for the particular vertical (jobs) in question. In an example embodiment, this search engine provides information about corresponding salaries for the job listings.

Figure 5:
FIGS. 5-7 are screen captures illustrating a graphical user interface for providing a free form search engine for job salary results, in accordance with an example embodiment.
Figure 6:
Figure 7:
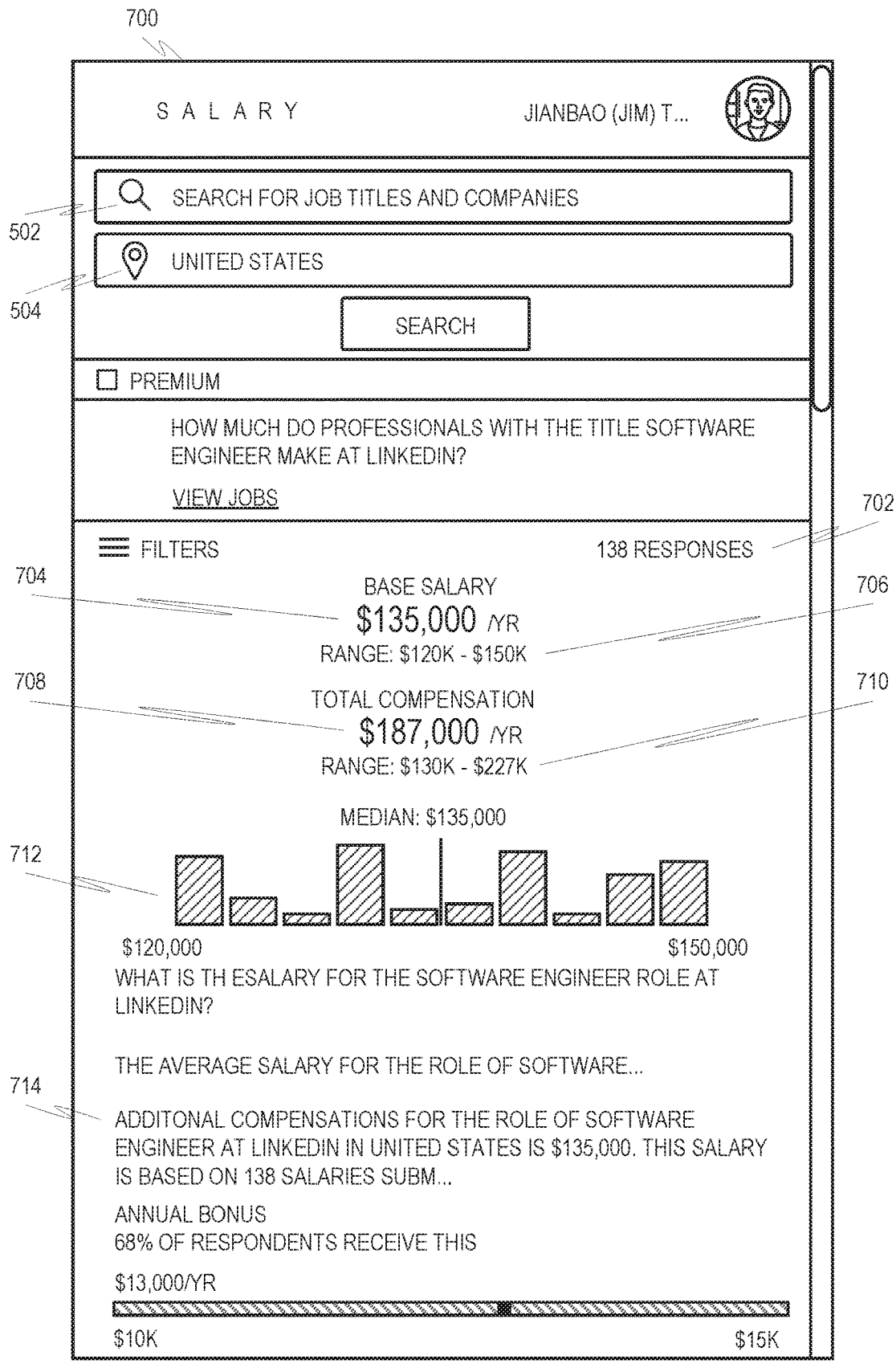

FIGS. 5-7 are screen captures illustrating a graphical user interface for providing a free form search engine for job salary results, in accordance with an example embodiment. In FIG. 5, the graphical user interface 500 includes a free form query box 502 and a location box 504. The user of the graphical user interface 500 may type free form queries in the free form query box 502 and specify a location in the location box 504 to attempt to find information about salaries of particular jobs. The location may be specified in the form of one of a number of predetermined locations at a granularity allowed by the free form search engine provider. For example, in some example embodiments, the lowest level of granularity for job posting results is region, such as San Francisco Bay Area or New York Metropolitan Area. The user may specify the location at a higher level of granularity (e.g., state or country), but not a lower level of granularity (e.g., town).

The combination of the input in the free form query box 502 and the specification of location in the location box 504 represents the search query. FIG. 6 depicts that the user has entered "linkedin software engineer" into the free form query box 502 and "United States" into the location box 504. Thus, the query is for salaries for jobs at LinkedIn with a title of software engineer in the United States. Here, for example, the graphical user interface 600 presents a first search result 602 involving complete matches, namely here the search terms "linkedin software engineer" and location (United States) match exactly. A second portion 604 of the graphical user interface 600 is used to present all of the top search results, including those that match less exactly, such as results 606, 608, 610, and 612.

The user is able to select on one of the search results to see additional insights. FIG. 7 is a screen capture that depicts the graphical user interface 700 used to convey these additional insights. Here, the user has selected the first search result 702, and the graphical user interface 700 displays the number of responses matching that search result 702 (indicating the number of people who have submitted their salary information for the first search result 602), a median base salary 704 as well as a base salary range 706, a median total compensation 708 as well as a total compensation range 710, and a histogram 712 depicting the base salary results. Information on additional compensations 714 are also presented.

Figure 8:
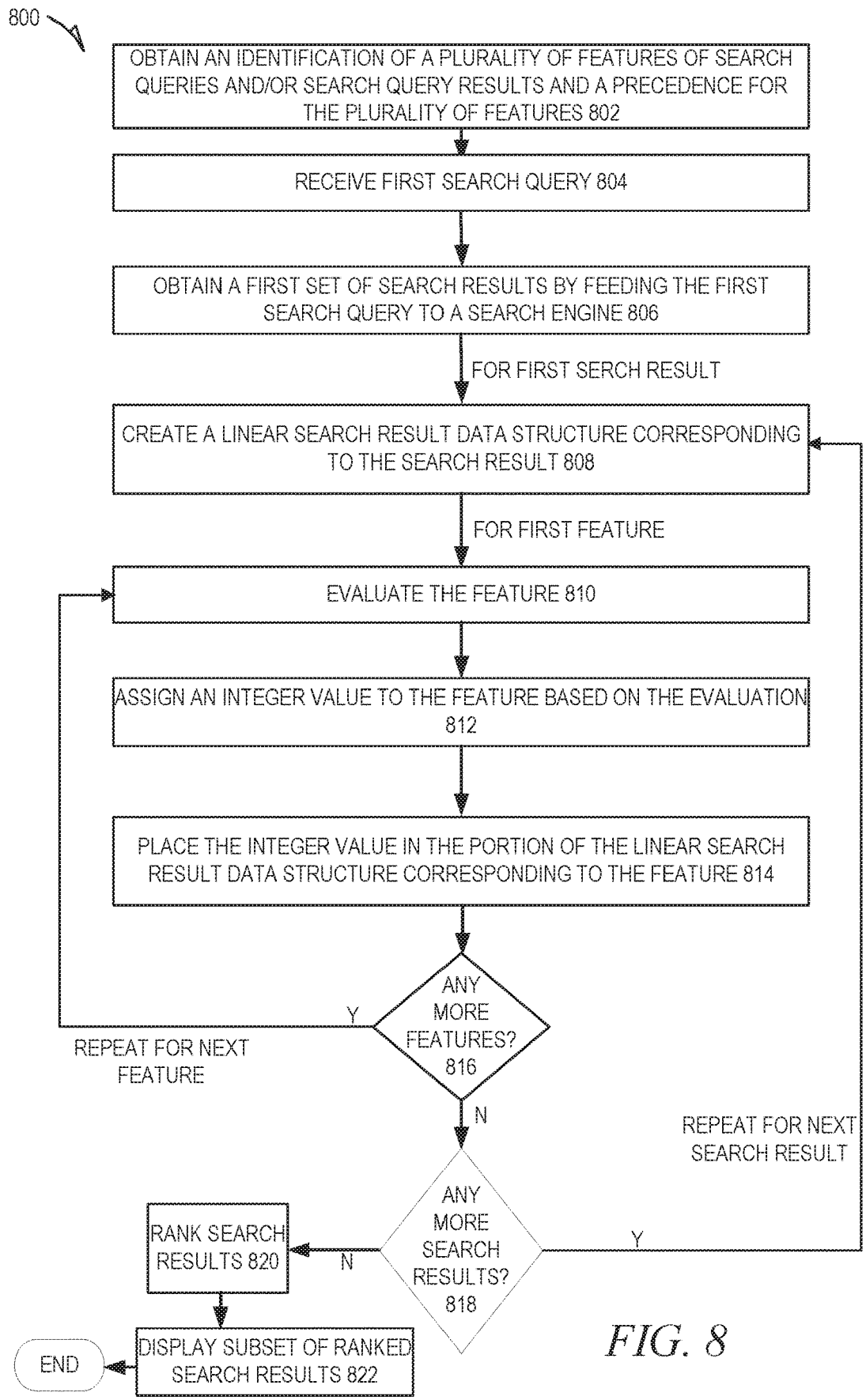
FIG. 8 is a flow diagram illustrating a method for quickly and efficiently ranking search results, in accordance with an example embodiment.

FIG. 8 is a flow diagram illustrating a method 800 for quickly and efficiently ranking search results, in accordance with an example embodiment. At operation 802, an identification of a plurality of features of search queries and/or search query results, and a precedence for the plurality of features, are obtained. The precedence indicates an ordering for the plurality of features. There are a number of different ways in which this identification and precedence can be obtained. In an example embodiment, a search engine provider or other entity explicitly provides the identification of the features and their precedence in a specification. In another example embodiment, some or all of this information may be inferred.

At operation 804, a first search query is received. At operation 806, a first set of search results is obtained by feeding the first search query to a search engine. A loop is then begun for each search result in the first set of search results. At operation 808, a linear search result data structure corresponding to the search result is created. The linear search result data structure contains a plurality of portions, with each portion corresponding to a different feature of the plurality of features, and the plurality of portions in the linear search result data structure being in an order matching the precedence. In an example embodiment, the linear search result data structure is a floating point and the portions correspond to digits of the floating point. The portions may have a fixed size (potentially a different size for each portion but the same size in every linear search result data structure).

A loop is then begun for each feature of the plurality of features. At operation 810, the feature may be evaluated. This evaluation may be based, for example, on some procedure provided by the search engine provider, or any other specified way to determine the feature. At operation 812, an integer value for the feature is assigned to the feature based on the evaluation of the feature. At operation 814, the integer value is placed in the portion of the linear search result data structure corresponding to the feature.

At operation 816, it is determined if there are any more features in the plurality of features. If so, then the method 800 loops back to operation 810 for the next feature in the plurality of features. If not, then at operation 818, it is determined if there are any more search results in the first set of search results. If so, then the method 800 loops back to operation 808 for the next search result in the first set of search results. If not, then at operation 820, the search results in the first set of search results are ranked by reading the portions of the linear search result data structure in order as a score, with a higher score corresponding to a higher ranking. At operation 822, a subset of the ranked search results are caused to be displayed in a graphical user interface based on the ranking.

Figure 9:
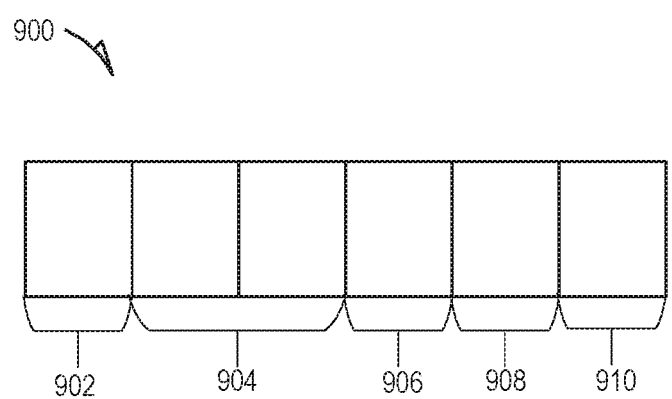
FIG. 9 is a diagram illustrating an example of a linear search result data structure, in accordance with an example embodiment.

FIG. 9 is a diagram illustrating an example of a linear search result data structure 900, in accordance with an example embodiment. This figure depicts the example linear search result data structure described earlier, where the following features are provided and given the following precedence (in order of importance): job location, number of matched terms, job title, age of listing, and similarity of company. A job location may then be represented by a first portion 902 comprising a first digit (either 1 or 0 depending upon whether the location of the job listing matches a location specified in the query). A number of matched terms may be represented by a second portion 904 comprising a second and third digit (0-99 matching terms between the query and the job listing). A job title may be represented by a third portion 906 comprising a fourth digit in the (0-9 depending on the degree that the query job title is similar to the job title in the job listing). An age of listing may be represented by a fourth portion 908 comprising a fifth digit (0-9 based on how old the listing is, with newer listings assigned a higher number). A similarity of company may be represented by a fifth portion 910 comprising a sixth digit (0-9 based on the similarity level).

Figure 10:
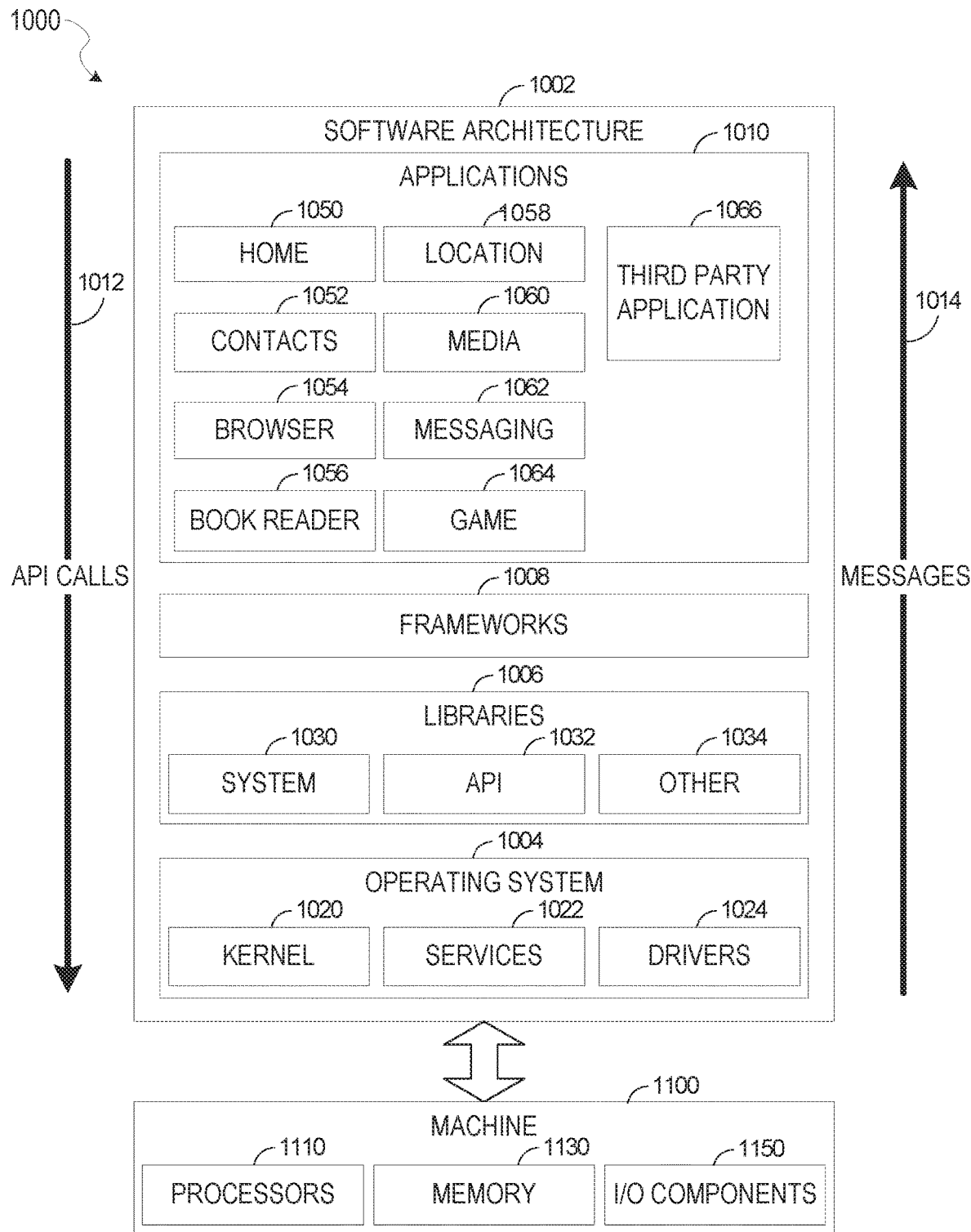
FIG. 10 is a block diagram illustrating a software architecture, in accordance with an example embodiment.

FIG. 10 is a block diagram 1000 illustrating a software architecture 1002, which can be installed on any one or more of the devices described above. FIG. 10 is merely a non-limiting example of a software architecture, and it will be appreciated that many other architectures can be implemented to facilitate the functionality described herein. In various embodiments, the software architecture 1002 is implemented by hardware such as a machine 1100 of FIG. 11 that includes processors 1110, memory 1130, and input/output (I/O) components 1150. In this example architecture, the software architecture 1002 can be conceptualized as a stack of layers where each layer may provide a particular functionality. For example, the software architecture 1002 includes layers such as an operating system 1004, libraries 1006, frameworks 1008, and applications 1010. Operationally, the applications 1010 invoke API calls 1012 through the software stack and receive messages 1014 in response to the API calls 1012, consistent with some embodiments.

In various implementations, the operating system 1004 manages hardware resources and provides common services. The operating system 1004 includes, for example, a kernel 1020, services 1022, and drivers 1024. The kernel 1020 acts as an abstraction layer between the hardware and the other software layers, consistent with some embodiments. For example, the kernel 1020 provides memory management, processor management (e.g., scheduling), component management, networking, and security settings, among other functionality. The services 1022 can provide other common services for the other software layers. The drivers 1024 are responsible for controlling or interfacing with the underlying hardware, according to some embodiments. For instance, the drivers 1024 can include display drivers, camera drivers, BLUETOOTH® or BLUETOOTH® Low Energy drivers, flash memory drivers, serial communication drivers (e.g., Universal Serial Bus (USB) drivers), Wi-Fi® drivers, audio drivers, power management drivers, and so forth.

In some embodiments, the libraries 1006 provide a low-level common infrastructure utilized by the applications 1010. The libraries 1006 can include system libraries 1030 (e.g., C standard library) that can provide functions such as memory allocation functions, string manipulation functions, mathematic functions, and the like. In addition, the libraries 1006 can include API libraries 1032 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 1006 can also include a wide variety of other libraries 1034 to provide many other APIs to the applications 1010.

The frameworks 1008 provide a high-level common infrastructure that can be utilized by the applications 1010, according to some embodiments. For example, the frameworks 1008 provide various graphical user interface (GUI) functions, high-level resource management, high-level location services, and so forth. The frameworks 1008 can provide a broad spectrum of other APIs that can be utilized by the applications 1010, some of which may be specific to a particular operating system 1004 or platform.

In an example embodiment, the applications 1010 include a home application 1050, a contacts application 1052, a browser application 1054, a book reader application 1056, a location application 1058, a media application 1060, a messaging application 1062, a game application 1064, and a broad assortment of other applications, such as a third-party application 1066. According to some embodiments, the applications 1010 are programs that execute functions defined in the programs. Various programming languages can be employed to create one or more of the applications 1010, structured in a variety of manners, such as object-oriented programming languages (e.g., Objective-C, Java, or C++) or procedural programming languages (e.g., C or assembly language). In a specific example, the third-party application 1066 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1066 can invoke the API calls 1012 provided by the operating system 1004 to facilitate functionality described herein.

Figure 11:
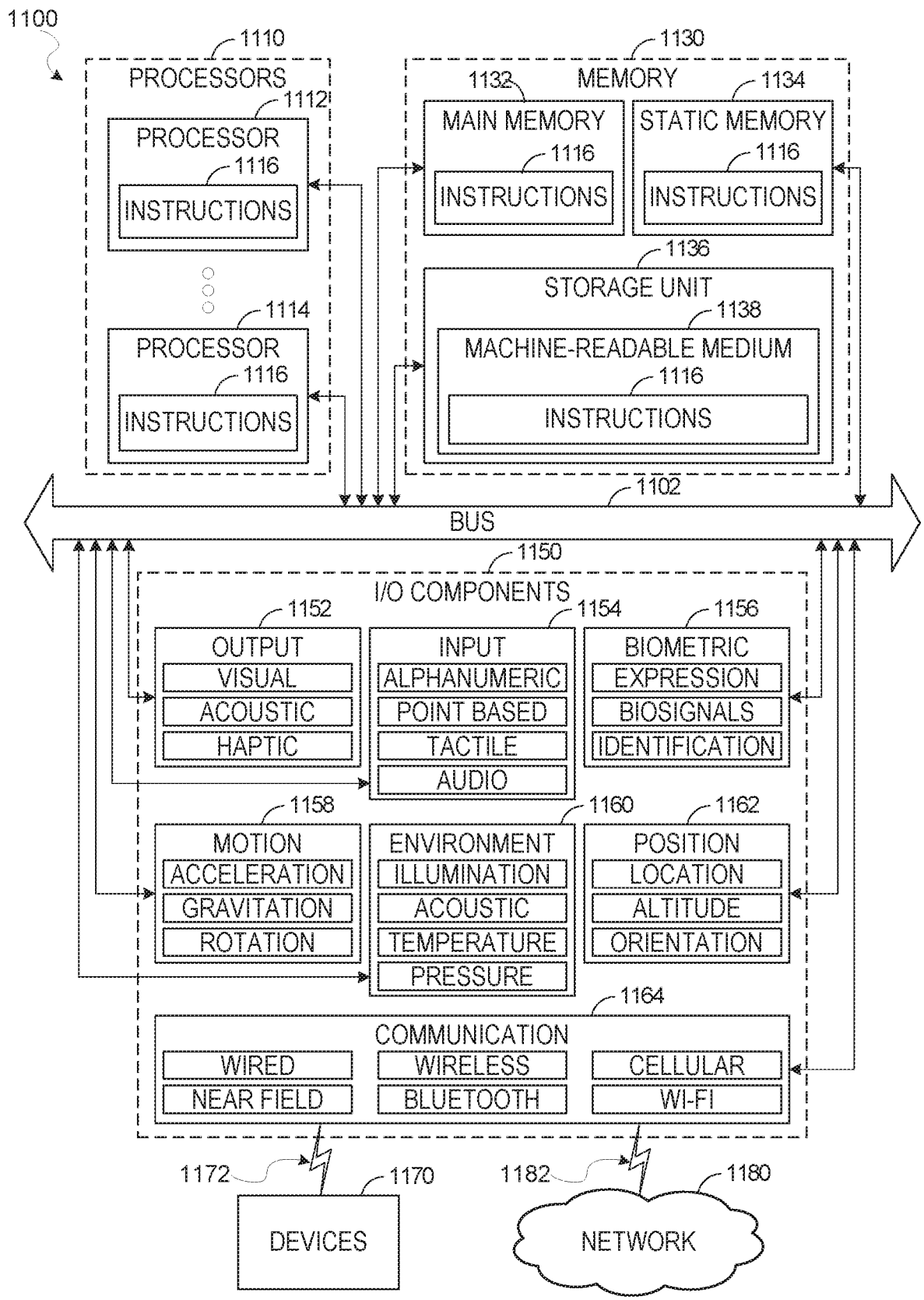
FIG. 11 illustrates a diagrammatic representation of a machine in the form of a computer system within which a set of instructions may be executed for causing the machine to perform any one or more of the methodologies discussed herein, according to an example embodiment.

FIG. 11 illustrates a diagrammatic representation of a machine 1100 in the form of a computer system within which a set of instructions may be executed for causing the machine to perform any one or more of the methodologies discussed herein, according to an example embodiment.

Specifically, FIG. 11 shows a diagrammatic representation of the machine 1100 in the example form of a computer system, within which instructions 1116 (e.g., software, a program, an application 1010, an applet, an app, or other executable code) for causing the machine 1100 to perform any one or more of the methodologies discussed herein may be executed. For example, the instructions 1116 may cause the machine 1100 to execute the method 800 of FIG. 8. Additionally, or alternatively, the instructions 1116 may implement FIGS. 1-8, and so forth. The instructions 1116 transform the general, non-programmed machine 1100 into a particular machine 1100 programmed to carry out the described and illustrated functions in the manner described. In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a PC, a tablet computer, a laptop computer, a netbook, a set-top box (STB), a portable digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any one or more of the methodologies discussed herein.

The machine 1100 may include processors 1110, memory 1130, and I/O components 1150, which may be configured to communicate with each other such as via a bus 1102. In an example embodiment, the processors 1110 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1112 and a processor 1114 that may execute the instructions 1116. The term "processor" is intended to include multi-core processors that may comprise two or more independent processors (sometimes referred to as "cores") that may execute instructions 1116 contemporaneously. Although FIG. 11 shows multiple processors 1110, the machine 1100 may include a single processor with a single core, a single processor with multiple cores (e.g., a multi-core processor), multiple processors with a single core, multiple processors with multiple cores, or any combination thereof.

The memory 1130 may include a main memory 1132, a static memory 1134, and a storage unit 1136, all accessible to the processors 1110 such as via the bus 1102. The main memory 1132, the static memory 1134, and the storage unit 1136 store the instructions 1116 embodying any one or more of the methodologies or functions described herein. The instructions 1116 may also reside, completely or partially, within the main memory 1132, within the static memory 1134, within the storage unit 1136, within at least one of the processors 1110 (e.g., within the processor's cache memory), or any suitable combination thereof, during execution thereof by the machine 1100.

The I/O components 1150 may include a wide variety of components to receive input, provide output, produce output, transmit information, exchange information, capture measurements, and so on. The specific I/O components 1150 that are included in a particular machine 1100 will depend on the type of machine 1100. For example, portable machines such as mobile phones will likely include a touch input device or other such input mechanisms, while a headless server machine will likely not include such a touch input device. It will be appreciated that the I/O components 1150 may include many other components that are not shown in FIG. 11. The I/O components 1150 are grouped according to functionality merely for simplifying the following discussion, and the grouping is in no way limiting. In various example embodiments, the I/O components 1150 may include output components 1152 and input components 1154. The output components 1152 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1154 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1150 may include biometric components 1156, motion components 1158, environmental components 1160, or position components 1162, among a wide array of other components. For example, the biometric components 1156 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1158 may include acceleration sensor components (e.g., accelerometer), gravitation sensor components, rotation sensor components (e.g., gyroscope), and so forth. The environmental components 1160 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1162 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1150 may include communication components 1164 operable to couple the machine 1100 to a network 1180 or devices 1170 via a coupling 1182 and a coupling 1172, respectively. For example, the communication components 1164 may include a network interface component or another suitable device to interface with the network 1180. In further examples, the communication components 1164 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1170 may be another machine or any of a wide variety of peripheral devices (e.g., a peripheral device coupled via a USB).

Moreover, the communication components 1164 may detect identifiers or include components operable to detect identifiers. For example, the communication components 1164 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1164, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., 1130, 1132, 1134, and/or memory of the processor(s) 1110) and/or the storage unit 1136 may store one or more sets of instructions 1116 and data structures (e.g., software) embodying or utilized by any one or more of the methodologies or functions described herein. These instructions (e.g., the instructions 1116), when executed by the processor(s) 1110, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions 1116 and/or data. The terms shall accordingly be taken to include, but not be limited to, solid-state memories, and optical and magnetic media, including memory internal or external to the processors 1110. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 1180 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1180 or a portion of the network 1180 may include a wireless or cellular network, and the coupling 1182 may be a Code Division Multiple Access (CDMA) connection, a Global System for Mobile communications (GSM) connection, or another type of cellular or wireless coupling. In this example, the coupling 1182 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data-transfer technology.

The instructions 1116 may be transmitted or received over the network 1180 using a transmission medium via a network interface device (e.g., a network interface component included in the communication components 1164) and utilizing any one of a number of well-known transfer protocols (e.g., HTTP). Similarly, the instructions 1116 may be transmitted or received using a transmission medium via the coupling 1172 (e.g., a peer-to-peer coupling) to the devices 1170. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1116 for execution by the machine 1100, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:
1. A system comprising:
    a computer-readable medium having instructions stored thereon, which, when executed by a processor, cause the system to:
    obtain an identification of a plurality of features of search queries and/or search query results, and a precedence for the plurality of features, the precedence indicating an ordering for the plurality of features;
receive a first search query;
obtain a first set of search results by feeding the first search query to a search engine;
for each search result in the first set of search results:
create a linear search result data structure corresponding to the search result, the linear search result data structure containing a plurality of portions, each portion corresponding to a different feature of the plurality of features, the plurality of portions in the linear search result data structure being in an order matching the precedence;
for each feature of the plurality of features:
evaluate the feature for the search result;
assign an integer value for the feature based on the evaluation of the feature;
place the integer value in the portion, corresponding to the feature, of the linear search result data structure for the search result;
rank the search results in the first set of search results by reading the portions of the linear search result data structure in order as a score, with a higher score corresponding to a higher ranking.

2. The system of claim 1, wherein the instructions further comprise causing display of a subset of the first set of search results in a graphical user interface based on the ranking.

3. The system of claim 1, wherein the linear search result data structure is a floating point.

4. The system of claim 3, wherein the portions are digits in the floating point.

5. The system of claim 1, wherein each portion is assigned a fixed number of digits in the linear search result data structure.

6. The system of claim 1, wherein the precedence is assigned by a search engine provider based on importance of each of the plurality of features to the search engine provider.

7. The system of claim 6, wherein the evaluation is based on instructions provided by the search engine provider.

8. A method comprising:
obtaining an identification of a plurality of features of search queries and/or search query results, and a precedence for the plurality of features, the precedence indicating an ordering for the plurality of features;
receiving a first search query;
obtaining a first set of search results by feeding the first search query to a search engine;
for each search result in the first set of search results:
creating a linear search result data structure corresponding to the search result, the linear search result data structure containing a plurality of portions, each portion corresponding to a different feature of the plurality of features, the plurality of portions in the linear search result data structure being in an order matching the precedence;
for each feature of the plurality of features:
evaluating the feature for the search result;
assigning an integer value for the feature based on the evaluation of the feature;
placing the integer value in the portion, corresponding to the feature, of the linear search result data structure for the search result;
ranking the search results in the first set of search results by reading the portions of the linear search result data structure in order as a score, with a higher score corresponding to a higher ranking.

9. The method of claim 8, further comprising causing display of a subset of the first set of search results in a graphical user interface based on the ranking.

10. The method of claim 8, wherein the linear search result data structure is a floating point.

11. The method of claim 10, wherein the portions are digits in the floating point.

12. The method of claim 8, wherein each portion is assigned a fixed number of digits in the linear search result data structure.

13. The method of claim 8, wherein the precedence is assigned by a search engine provider based on importance of each of the plurality of features to the search engine provider.

14. The method of claim 13, wherein the evaluation is based on instructions provided by the search engine provider.

15. A non-transitory machine-readable storage medium comprising instructions which, when implemented by one or more machines, cause the one or more machines to perform operations comprising:
obtaining an identification of a plurality of features of search queries and/or search query results, and a precedence for the plurality of features, the precedence indicating an ordering for the plurality of features;
receiving a first search query;
obtaining a first set of search results by feeding the first search query to a search engine;
for each search result in the first set of search results:
creating a linear search result data structure corresponding to the search result, the linear search result data structure containing a plurality of portions, each portion corresponding to a different feature of the plurality of features, the plurality of portions in the linear search result data structure being in an order matching the precedence;
for each feature of the plurality of features:
evaluating the feature for the search result;
assigning an integer value for the feature based on the evaluation of the feature;
placing the integer value in the portion, corresponding to the feature, of the linear search result data structure for the search result;
ranking the search results in the first set of search results by reading the portions of the linear search result data structure in order as a score, with a higher score corresponding to a higher ranking.

16. The non-transitory machine-readable storage medium of claim 15, wherein the instructions further comprise causing display of a subset of the first set of search results in a graphical user interface based on the ranking.

17. The non-transitory machine-readable storage medium of claim 15, wherein the linear search result data structure is a floating point.

18. The non-transitory machine-readable storage medium of claim 17, wherein the portions are digits in the floating point.

19. The non-transitory machine-readable storage medium of claim 15, wherein each portion is assigned a fixed number of digits in the linear search result data structure.

20. The non-transitory machine-readable storage medium of claim 15, wherein the precedence is assigned by a search engine provider based on importance of each of the plurality of features to the search engine provider.

* * * * *